April 24, 1962 A. W. RUSSELL 3,031,013
PLASTIC STRUCTURAL MEMBER
Filed Aug. 26, 1954 2 Sheets-Sheet 1
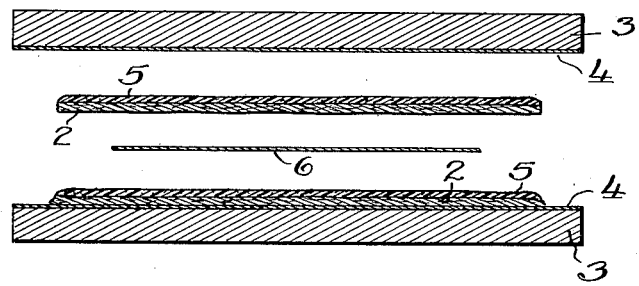
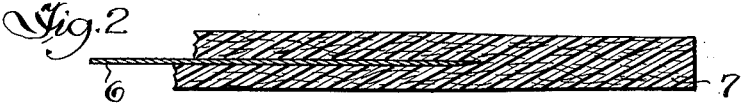
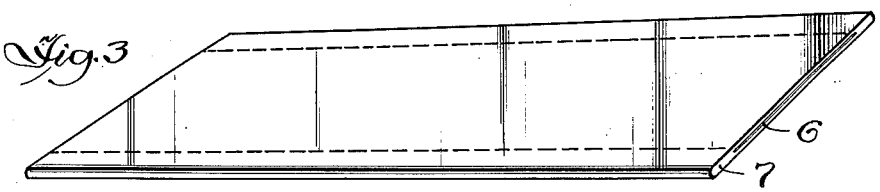
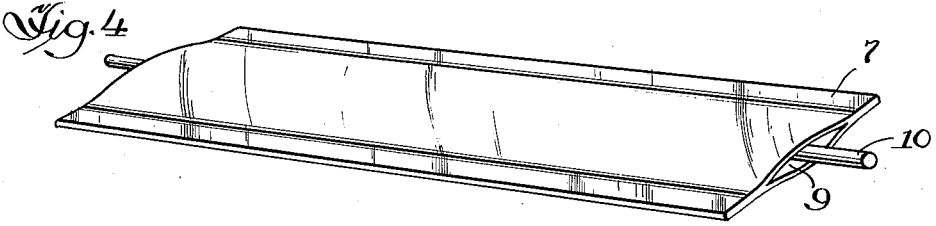
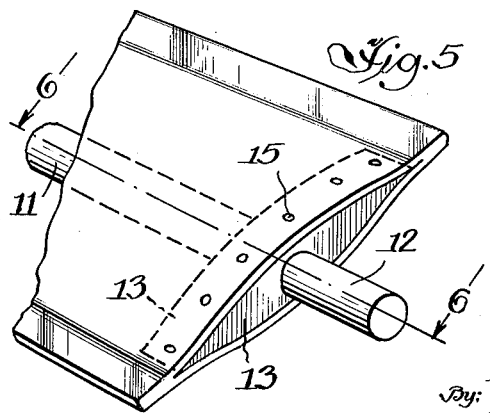
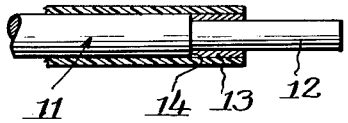
Inventor
Alfred W. Russell
By: Schneider & Dressler,
Attys.

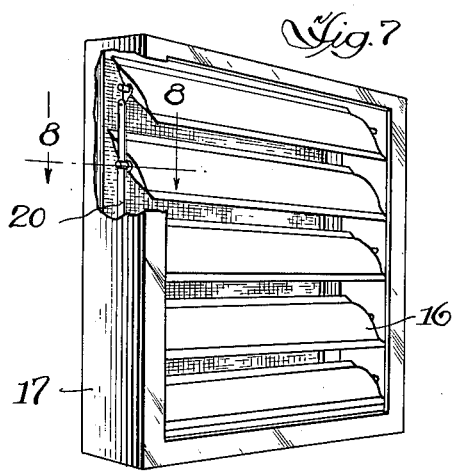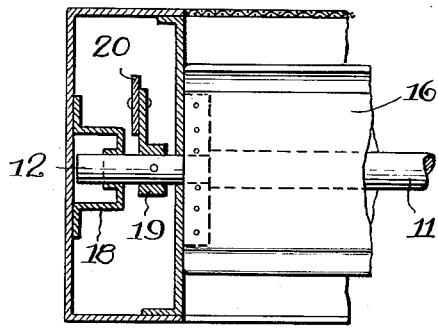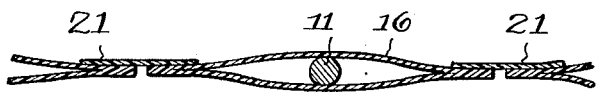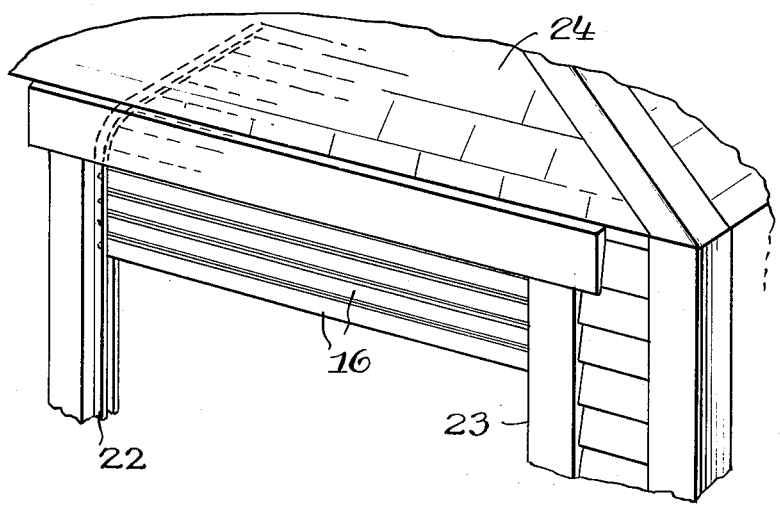

United States Patent Office 3,031,013
Patented Apr. 24, 1962

3,031,013
PLASTIC STRUCTURAL MEMBER
Alfred W. Russell, Farmingdale, N.Y., assignor to Russell Reinforced Plastics Corporation, a corporation of New York
Filed Aug. 26, 1954, Ser. No. 452,289
1 Claim. (Cl. 160—236)

This invention relates to plastic structural members, particularly to reinforced plastic structural members and to methods of making the same.

Plastic or reinforced plastic sheet products having light transmitting qualities, high strength-weight ratios, impact resistance and ease of workability are desirable as durable, permanently colored members of varied structural and ornamental value in the building construction field as louvers, jalousies, wall panels, door panels, patio and other roofing members, shower stall panels, and similar articles, particularly where light and/or ventilation control is desired. The plastic sheet products of the present invention have these desirable characteristics and are suitable for the uses named as well as other uses in the building construction and other fields.

The use of plastic or reinforced plastic sheet products in the building materials field has heretofore been seriously restricted because of the low modulus of elasticity in bending of such products, even when reinforced in manners known to the art. The present invention contemplates bonding and curing two or more sheets of plastic material into a unit having a centrally disposed pocket extending longitudinally of the unit and defined by unbonded areas of the plastic material. A reinforcing rod, which is positioned in the pocket, is preferably of transparent plastic material, such as polystyrene, for example, but may be of wood, metal or any other suitable material.

The ends of the rod project beyond opposite ends of the unit to serve as pivotal supporting members so that the unit may be used as a slat or louver in jalousies, partitions, doors, or any other suitable building construction. The slats may be hinged in side by side relationship by flexible strips adhered to adjacent slats, or may be pivoted individually in either lapped or abutting relationship. The slats may be arranged either horizontally or vertically and, if desired, each rod may have a pinion gear meshing with a common rack so that all of the slats can be moved simultaneously and uniformly by operating the rack. Individually pivoted slats may also be operatively connected by suitable links to a common bar for uniform pivotal movement.

In accordance with the invention, two or more superposed thicknesses of plastic material capable of polymerizing and/or curing to a rigid, solid state, either with or without fiber reinforcement, are bonded together only at their contiguous lateral edges and cured. Any thermosetting resin such as a liquid polymerizable, resinous material capable of curing to a rigid, solid, resinous state may be used. If the resin used is one which will adhere to metal, the mold in which laminating and curing is effected is preliminarily coated with a suitable mold release agent to prevent adherence of the resin thereto, in accordance with conventional procedures. The center portion of the layers of plastic material, throughout the length thereof, are kept from adhering by the use of a separating sheet which will not dissolve in the resin and to which the resin will not adhere, or will adhere to only an insubstantial extent. The separating sheet may be removed, but if it is transparent or translucent, such as cellophane, for example, it may remain in place without adverse effect on the finished product.

The structure by means of which the above and other advantages of the invention are attained, and the various materials that may be used in the manufacture of the structural member, will be fully described in the following specification, taken in conjunction with the accompanying drawing showing preferred illustrative embodiments of the invention, in which:

FIGURE 1 is a diagrammatic view of the arrangement of the various components in one method of making the laminate and providing the lengthwise non-adhered area or pocket therein;

FIG. 2 is a fragmentary cross sectional view through the laminate;

FIG. 3 is a perspective view of the laminate;

FIG. 4 is a perspective view of the structural member with a reinforcing rod within the pocket of the laminate;

FIG. 5 is a fragmentary perspective view of one end of a laminate having an end filler through which a rod extends;

FIG. 6 is a cross sectional view, taken substantially along the line 6—6 of FIG. 5;

FIG. 7 is a perspective view of a jalousie comprising a series of units pivotally mounted in a window frame, with a portion of the window frame broken away;

FIG. 8 is a cross sectional view, taken upon the line 8—8 of FIG. 7;

FIG. 9 is a cross sectional view, showing a plurality of units hinged together along their longitudinal edges; and FIG. 10 is a fragmentary perspective view showing an overhead garage door comprising a plurality of units hinged together along their longitudinal edges.

In a preferred form of the invention a layer 2 of fiber is laid on a plate 3 having a smooth, flat surface which may be treated to keep the resin from adhering thereto. The plate forms the bottom wall of a mold. As illustrated, the mold is an open mold, but it may be a closed mold, if desired. The smooth, flat surface of plate 3 may be polished metal, but I prefer to apply a sheet 4 of cellophane, or similar material to which the resin will not adhere during curing, on the metal plate and place the fiber on the cellophane sheet. Examples of other materials which may be used are polyvinylalcohol film, wax, lubricating material such as silicone resin compounds, and other mold release agents conventionally used in the resin molding art. The area of the sheet 4 of cellophane or like material is preferably larger than the area of the layer of fiber, for a reason hereinafter disclosed.

Various types of fiber which have proved to be satisfactory include nonorganic fibers such as glass fiber, commercially available under the trade-mark "Fiberglas," natural fiber such as hogs hair, and synthetic fiber such as nylon, rayon, acrylic fiber (a copolymer of vinyl chloride and acrylonitrile) commercially available under the trade-mark "Dynel," acrylic fiber (formed from a polymer of acrylonitrile) commercially available under the trade-mark "Orlon," and polyvinylidene chloride-polyvinyl chloride copolymer fiber commercially available under the trade-mark "Saran." The fibers may be mixed, or may be of a single kind, and may be woven or nonwoven. Ordinarily the fiber sheet or mat is in the form of a single layer, but a multiplicity of layers may be used, if desired.

A suitable resin 5 is then poured on the fiber mat to impregnate the same and/or fill the interstices thereof. Although a thermoplastic resin may be used, I prefer to use any thermosetting resin in a viscous liquid state, such as a partially polymerized resinous liquid material capable of curing to a rigid, solid resinous state. Examples of such thermosetting resins are polymerizable unsaturated alcohol polyesters of polybasic acids such as phthalic, terephthalic, oxalic, carbonic, succinic, sebacic, azalaic and adipic acids, inluding diallyl oxalate, diallyl carbonate, diallyl succinate, diallyl adipate, diallyl maleate, diallyl fumarate, diallyl itaconate, ethylene glycol bis (allyl carbonate), diethylene glycol bis (allyl carbonate), and mixtures thereof. Still other desirable resins are polymerizable unsaturated alcohol esters of unsaturated acids such as the esters of vinyl, allyl, methallyl, beta ethyl allyl, crotyl, propargyl, methyl propargyl, phenyl propargyl, oleyl, linoleyl, ricinoleyl, or cinnamyl alcohol and unsaturated acids such as acrylic, methacrylic, alpha or beta chloracrylic, crotonic or cinnamic acids, including allyl acrylate, allyl alpha chloracrylate, etc.

And still other desirable thermosetting resins are polyhydric alcohol esters of unsaturated acids such as acrylic, methacrylic, alpha or beta chloracrylic, furamic, maleic, itaconic, crotonic, etc. and polyhydric alcohols such as ethyleneglycol, diethylene glycol, triethylene glycol, hexaethylene glycol, propylene glycol, dipropylene glycol,, glycerol, sorbitol, and mannitol, including ethylene glycol diacrylate, etc.

Polyhydric alcohol polyesters of polybasic acids are also desirable thermosetting resins which may be used in accordance with the present invention. These include esters of the above mentioned polyhydric alcohols and maleic, itaconic, citraconic, or fumaric acids. Such esters may include alkyds such as ethylene glycol maleate or fumarate or compounds such as ethylene glycol bis (ethylene fumarate), etc., and esters formed by the reaction of polyhydric alcohol-unsaturated dibasic acid esters having an acid number below about 150 with a monohydric alcohol such as methyl, ethyl, or propyl alcohol in an amount sufficient to reduce the viscosity, and the monobasic reaction products thereof, as described in Patent No. 2,418,633 issued to Charles Gould.

It is also possible to use polymerizable ethers including divinyl ether, etc. and copolymers of the ethers and any of the above compounds, or other organic compounds containing two or more unsaturated, unconjugated groups, including divinyl naphthalene, divinyl benzene, divinyl acetylene, vinyl acetylene, etc.

Glycerol phthalate, liquid phenol-aldehyde resins, melamine-aldehyde condensation products and urea condensation products, alone or in admixture with the above compounds containing one or more polymerizable groups, are additional examples of liquid polymerizable or condensable materials capable or curing to a thermosetting state which may also be used.

Solid or semisolid polymerizable resinous compositions may be dissolved in polymerizable liquids or in plasticizers to provide the necessary fluidity. Liquid compositions that are too fluid to be used may be partially polymerized or may be blended with more viscous materials to attain the desired viscosity for impregnating the fiber mat. Such fluid compositions may be partially polymerized with heat in the presence of catalysts such as benzoyl peroxide, acetone peroxide, lauroyl peroxide, or methyl ethyl ketone peroxide. For example, diallyl phthalate containing 5 percent by weight of benzoyl peroxide may be heated at 80° to 85° C. in a flask provided with a glass tube having two spaced marks. The diallyl phthalate is drawn up in the tube and allowed to flow back, the time required for the liquid to flow between the two marks being observed with a stop watch. The liquid is stirred during the heating, and when the time for the flow between the two marks increases to 15 times the initial time required at the beginning of the heating period, the composition is sufficiently viscous for use in accordance with the invention and may be cooled to room temperature.

Other desirable thermosetting resins which may be used in accordance with the invention are epoxy resins which are presently sold by Ciba Company, Inc. under the trademark "Araldite" and by Shell Chemical Corp. under the trademark "Epon." These resins have a tendency to adhere to metal during curing, but not if the metal is coated with wax, lubricating material or other mold release agents conventionally used in the resin molding art.

After the fiber mat has been thoroughly impregnated and covered with resin, a strip 6 of cellophane or similar material that will not adhere to the resin when it is cured, of less width than the fiber mat, is placed centrally on top of the impregnated fiber mat and then an additional layer 2 of fibers is superimposed over the impregnated mat and the cellophane. Another application of resin 5 is poured over the second layer of fiber to impregnate and cover it. If additional thickness is desired the process may be repeated, with or without the inner strip of cellophane, depending on the pocket structure desired. Strip 6 is of at least the same length as the layers of fiber but is of less width and is centrally disposed with respect to the longitudinal edges of the fiber layers, so that when the mass is cured the longitudinal edges of the resin-impregnated layers will be bonded together, and the central portion coincident with the area of the cellophane strip will be separated to form an open ended pocket. Another plate 3 is placed over the uppermost layer of resin-impregnated fibers, with a sheet 4 of cellophane or similar material interposed between the resin and the smooth, flat surface of the plate. The weight of the upper plate, with the addition of pressure if required, will squeeze any excess resin from the layers of fiber to the sides of the fibers and between the overlapping cellophane sheets to provide beads of resinous material laterally of the laminate which seal the same against entry of air during the curing process. The projecting areas of cellophane sheets 4 preferably are sufficiently extensive to prevent any of the excess resin from coming in contact with plates 3. Plates 3 may be part of a mold or may be placed in a suitable mold, and the mold may then be heated to cure the resin if heating is required for curing. The mold may be cooled to set the resin where the resin is a liquefied thermoplastic resin.

Although the resin has been described as being used in connection with layers of fiber, and such construction is preferred, because of the reinforcing value of the fiber, it should be understood that the fiber may be omitted, and the structural member made entirely of plastic material. Many plastic materials, when fabricated in accordance with my invention, provide structural members having sufficient strength for their intended use without the additional reinforcement afforded by fiber.

The curing or setting of the resin, with or without the fiber reinforcement, may be effected without applied pressure, depending only on the weight of the upper plate 3 and/or the top of the mold, or with an applied pressure of up to about 300 pounds per square inch. Higher pressures can be used, if desired, but with the polymerizable resins presently available this is not necessary. For example, using a viscous, liquid, polymerizable type of resin, such as ethylene glycol maleate alkyd, I prefer to effect the curing of the resin at zero pounds applied pressure or low applied pressures up to about 250 pounds per square inch.

The curing bonds the resin and fiber into a unitary structure having a single thickness, indicated at 7, FIG. 3, separated only along its central longitudinal area contiguous to cellophane sheet 6 to form an open ended pocket 9 extending longitudinally of the unit. When the unit is removed from the mold after curing, cellophane sheet 6 may be removed, but is preferably left in place because, being transparent, it does not detract from the appearance of the finished unit.

A reinforcing rod 10 is inserted into pocket 9 with its ends extending beyond each end of the plastic material. The rod is preferably of cylindrical shape, but may be of any desired shape and provided with cylindrical ends so that the unit may be pivotally mounted in the structure in which it is used. The rod is preferably made of plastic material, but may be made of metal, wood, or other suitable materials. Transparent or translucent plastic materials such as polystyrene are especially preferred because they enhance the appearance of the final product.

The insertion of rod 10 into pocket 9 stretches the separated portions of the plastic sheets and puts them under tension. The rod causes the separated portions of the plastic sheets to assume the shape of "Witch of Agnesi" curves which serve to provide a structure of great strength and rigidity to make the unit useful as a structural member whenever resistance to twisting is necessary. The tension of the laminated sheets also holds the rod against accidental longitudinal displacement.

In FIGS. 5 and 6 I have illustrated another embodiment of the invention in which a rod 11 has its opposite ends of reduced diameter, as indicated at 12. An end filler 13 is mounted on each end 12 after rod 11 has been inserted into the pocket, and these end fillers are pushed inwardly until each abuts the shoulder 14 formed at the base of each end portion 12. The intermediate portion of rod 11, between end portions 12, is preferably of such length that when each end filler 13 abuts its adjacent shoulder 14 the outer ends of the end fillers are flush with the outer ends of the plastic member. The end fillers preferably have a vertical transverse cross section having its outer surface shaped in "Witch of Agnesi" curves to conform to the curvature of the plastic sheets caused by the enlarged intermediate portion of the rod. This shape provides a complete closure at each end of the plastic member and also causes the end fillers to cooperate with the rod to hold the separated pocket portions of the plastic member under tension to increase the resistance of the plastic member to twisting. The end fillers are secured within the end portions of pocket 9 by suitable fastening members 15 to prevent longitudinal displacement of either the rod or the end fillers.

In FIGS. 7 and 8 I have shown a jalousie comprising a plurality of slats 16 mounted in a window frame 17. Frame 17 is provided with a plurality of spaced journal boxes 18 in which opposite ends 12 of rods 11 are rotatably supported. Each rod has a link 19 pinned thereto adjacent the journal box 18, and the opposite end of each link is pivotally secured to a common rod or bar 20. Since the connection between each link and its rod is rigid, reciprocation of rod 20 moves all of the slats pivotally in uniform manner. Any suitable handle (not shown) may be secured to rod 20 to facilitate reciprocation of the rod.

In FIGS. 9 and 10 the slats 16 are arranged in side by side relationship with slight gaps between adjacent edges.

The slats are held in this relationship by flexible strips 21 that are adhered in any suitable manner to adjoining edges of adjoining slats. The flexible strips 21 may be of substantial length and extend longitudinally of the slats, or a plurality of narrow strips extending transversely of the slats may bridge each gap. The projecting ends of the rods are mounted in tracks 22 on opposite sides of a doorway 23. Tracks 22 continue under the roof 24 of the structure in a smooth curve so that the slats may be moved upwardly with their opposite ends guided by the tracks. The flexible hinge joint permits the slats to follow the curvature of the tracks so that the doorway may be opened or closed with a minimum of effort.

While I have described a few preferred embodiments of my invention in detail, it will be understood that the description thereof is illustrative rather than restrictive, as many details may be modified or changed without departing from the spirit or scope of my invention. Accordingly, I do not desire to be restricted to the exact construction described.

I claim:

A plastic structural member comprising a laminate of plastic material bonded together along its longitudinal edge portions and provided with a longitudinally extending pocket in its center portion, a rod positioned lengthwise in said pocket, said rod having shoulders within said pocket, said shoulders defining end portions of reduced diameter, and end fillers mounted on said reduced end portions in abutting relationship to said shoulders, said end fillers being positioned within said pocket adjacent each end thereof, the outer ends of said end fillers being flush with the outer ends of said pockets, said reduced end portions of said rod projecting beyond the ends of said pocket to provide means for pivotally supporting said structural member.

References Cited in the file of this patent

UNITED STATES PATENTS

| | | |
|---|---|---|
| 2,142,629 | Clark | Jan. 3, 1939 |
| 2,169,873 | Clark | Aug. 15, 1939 |
| 2,170,938 | Carreras et al. | Aug. 29, 1939 |
| 2,229,225 | Schneider | Jan. 21, 1941 |
| 2,230,707 | Wallace | Feb. 4, 1941 |
| 2,608,502 | Merriman | Aug. 26, 1952 |
| 2,649,151 | Walker | Aug. 18, 1953 |
| 2,748,048 | Russell | May 29, 1956 |